United States Patent [19]

Taga et al.

[11] Patent Number: 5,036,030
[45] Date of Patent: Jul. 30, 1991

[54] PROCESS FOR PREPARATION OF ALKALINE EARTH METAL ALUMINOSILICATE SINTERED BODY

[75] Inventors: Genji Taga, Tokuyama; Masaki Noritake, Shin-nanyo; Masahiro Nakamura; Hua-Min Zhang, both of Tokuyama, all of Japan

[73] Assignee: Tokuyama Soda Kabushiki Kaisha, Japan

[21] Appl. No.: 459,422

[22] Filed: Dec. 29, 1989

[51] Int. Cl.$^5$ .................................................. C04B 35/02
[52] U.S. Cl. ................................. 501/125; 423/328 C
[58] Field of Search ................ 501/123, 125; 423/277, 423/279, 328, 328 C, 328 M

[56] References Cited
U.S. PATENT DOCUMENTS 3,328,119  6/1967  Robson et al. .................. 423/277
3,586,479  6/1971  Heinze et al. .................... 423/328
4,049,573  9/1977  Kaeding ........................... 252/432
4,814,303  3/1989  Chowdhry et al. ............... 501/119

Primary Examiner—William R. Dixon, Jr.
Assistant Examiner—Chris Gallo
Attorney, Agent, or Firm—Sherman and Shalloway

[57] ABSTRACT

An alkaline earth metal aluminosilicate sintered body is obtained by molding a starting mixture of a zeolite having an alkaline earth metal form and an $SiO_2/Al_2O_3$ molar ratio not higher than 3.0 and a boron compound such as boron oxide, and firing the molded body at a temperature lower than 1,000° C. An amorphous calcination product formed by calcining the zeolite may also be used in the starting mixture with the boron compound. This process allows the range of firing temperatures suitable for formation of a sintered body to be varied over a range of from about 50° to 150° C. or more while also allowing lower firing temperatures than in the absence of the boron compound to be used while still obtaining the desired densified sintered body.

12 Claims, No Drawings

PROCESS FOR PREPARATION OF ALKALINE EARTH METAL ALUMINOSILICATE SINTERED BODY

BACKGROUND OF THE INVENTION (1) Field of the Invention

The present invention relates to a process for the preparation of an alkaline earth metal aluminosilicate sintered body.

(2) Description of the Related Art

Sintered bodies of inorganic powders of alumina and the like are most widely used as electric insulators for electronic parts such as IC packages because electric characteristics and mechanical characteristics of these sintered bodies are preferable. At the present, these sintered bodies are mainly prepared by the so-called cofiring method in which an unfired molded body of an inorganic powder is printed with an electric circuit by using an electroconductive substance, the molded body is then fired and the obtained circuit-printed fired body is used as an electrically insulating material. This method, however, is defective in that since a high temperature is necessary for sintering an inorganic powder, only an expensive electroconductive substance capable of enduring a high firing temperature can be used. For example, since an alumina powder is sintered at a firing temperature higher than 1500° C., if it is intended to obtain an electric circuit-printed sintered body by using the alumina powder according to the cofiring technique, an expensive electroconductive substance such as Mo, Mn or W should be used. Moreover, this expensive substance is not completely satisfactory in the electroconductivity.

Accordingly, research has been made on the preparation of sintered bodies capable of being cofired with Ag, Au, Cu and the like having a good electroconductivity. One of us previously proposed a process for preparing an anorthite type sintered body by molding a powder of a specific calcium type zeolite and firing the molded body at a temperature lower than 1000° C. (see Japanese Unexamined Patent Publication No. 89-100060). Furthermore, U.S. Pat. No. 4,814,303 discloses a process for preparing a ceramic body by firing a powder of a specific zeolite at a temperature of 900° to 1350° C. These sintered bodies are advantageous over the conventional sintered bodies in that the manufacturing cost is low and the sintering can be carried out at lower temperatures.

However, these processes are still insufficient in that the allowance in the variation of the firing temperature is very narrow if it is intended to obtain a sintered body having a high density as close to the theoretical density as possible, and the control of the temperature at the firing step is industrially difficult. For example, the above-mentioned calcium type zeolite is not sintered if the temperature at the firing step is low, and in contrast, if the temperature at the firing step is too high, bubbles are confined in the sintered body or bubbling or swelling is caused, resulting in reduction of the yield. Accordingly, the firing temperature should be controlled within a very narrow range, for example, from 880° to 900° C.

SUMMARY OF THE INVENTION

It is therefore a primary object of the present invention to provide a process for the preparation of a sintered body, in which a broad range of firing temperatures can be adopted.

Another object of the present invention is to provide a process for the preparation of a sintered body, in which sintering can be accomplished at a low firing temperature.

Still another object of the present invention is to provide a sintered body which can be combined with a metallic material having a good electroconductivity by the cofiring technique.

In accordance with the present invention, these objects can be attained by a process for the preparation of an alkaline earth metal aluminosilicate sintered body, which comprises molding a starting mixture comprising a zeolite of an alkaline earth metal form having an $SiO_2/Al_2O_3$ molar ratio not higher than 3.0 or an amorphous calcination product formed by calcining said zeolite and a boron compound selected from the group consisting of boron oxide and boron compounds capable of being converted to boron oxide by firing, and firing the molded body at a temperature lower than 1000° C.

The foregoing and other objects and features will become apparent from the following detailed description.

DETAILED DESCRIPTION OF THE INVENTION

A specific zeolite or an amorphous calcination product obtained by calcining this specific zeolite is used as one starting material in the present invention.

Zeolites are known as inorganic ion exchangers, A variety of zeolites are naturally produced as minerals and are industrially synthesized Such known zeolites can be used in the present invention, but in order to obtain a sintered body at a low temperature, the zeolite used in the present invention should be a zeolite of an alkaline earth metal form having an $SiO_2/Al_2O_3$ molar ratio not higher than 3. Zeolites generally having an $SiO_2/Al_2O_3$ molar ratio of at least 1.5. Accordingly, the $SiO_2/Al_2O_3$ molar ratio is preferably from 1.5 to 3 in the zeolite used in the present invention. In order to obtain a sintered body from a zeolite having an $SiO_2/Al_2O_3$ molar ratio higher than 3, a high temperature, for example, a temperature higher than 1200° C., is necessary for the firing, and therefore, the intended objects of the present invention cannot be attained in this case.

In case of a zeolite having an ion exchange portion composed substantially of a form other than the alkaline earth metal form, for example, a zeolite in which at least 80% of the ion exchange portion is of a sodium form, the obtained sintered body is not satisfactory in the electrically insulating property, and the intended objects of the present invention cannot be attained. Accordingly, the zeolite of this type cannot be used as the starting material in the present invention.

A typical zeolite preferably used as the starting material in the present invention is represented by the following general formula [I]:

$$(iM^1O.jM_2^2O).lAl_2O_3.mSiO_2.nH_2O \quad [I]$$

wherein the parenthesized portion is an ion exchange portion, $M^1$ represents an alkaline earth metal ion, $M^2$ represents an alkali metal ion or an ammonium ion, i, j, l and m are numbers satisfying the requirements of $i+j=1$, $j=0$ to 0.15, preferably 0.01 to 0.1, $l=0.9$ to 1.1, $m=1.5$ to 3.0 and $m/l=1.5$ to 3, and n is 0 or a positive number.

As the alkaline earth metal ion $M^1$, there can be mentioned magnesium, calcium, strontium and barium. $M^1$ can be constructed by one of such alkaline earth metal ions or two or more of them. A zeolite, in which calcium and magnesium ions are co-present as the alkaline earth metal ion, the Mg/Ca molar ratio is from 0.05 to 1, preferably from 0.05 to 0.3, and a part or all of the ion exchange portion in the general formula [I] is constructed by calcium and magnesium, is especially preferable because sintering can be accomplished at a lowest temperature. As the alkali metal ion $M^2$ in the general formula [I], there can be mentioned lithium, sodium and potassium. Two or more of these alkali metals may be co-present. Synthetic zeolites are generally prepared in the state where the ion exchange portion shown in the general formula [I] is of a sodium (Na) form, and after the synthesis, a part or all of this sodium form is converted to form of an alkaline earth metal as mentioned above, other alkali metal ion, an ammonium ion or the like. Accordingly, in many cases, $M^2$ is a sodium ion. Since the content of $M^2$ is too high, the electrically insulating property is not sufficient, and therefore, the content of $M^2$ in the ion exchange portion is preferably controlled to up to 15%.

Accordingly, a zeolite represented by the following general formula [II] is most preferably used as the zeolite for attaining the objects of the present invention, that is, for accomplishing sintering at a lower temperature and broadening the range of applicable sintering temperatures:

$$(kCaO.pMgO.qM_2{}^2O).1Al_2O_3.mSiO_2.nH_2O \qquad [II]$$

wherein $M^2$ represents an alkali metal ion or an ammonium ion, k, p, q, l and m are numbers satisfying the requirements of $k+p+q=1$, $p/k=0.05$ to 1, $q=0$ to 0.15, preferably 0.01 to 0.1, $l=0.9$ to 1.1, $m=1.5$ to 3.0 and $m/l=1.5$ to 3.0, and n is 0 or a positive number.

Whether or not the zeolite used is a zeolite represented by the general formula [I] or [II] can be easily judged by the elementary analysis and X-ray diffractometry. It is known that a zeolite of an alkaline earth metal form has characteristic diffraction angles according to the kind of the alkaline earth metal, and therefore, the above judgment can be made very easily. Namely, in the X-ray diffraction chart, the A-type zeolite has diffraction angles at $2\theta=29.8°$, $27.0°$, $23.9°$ and $21.5°$, the X-type zeolite has diffraction angles at $2\theta=23.2°$, $26.6°$ and $30.9°$.

In view of the easy availability, zeolite 5A, zeolite X, gismondite, laumonite and zeolites formed by ion exchange in the ion exchange portion in the foregoing zeolites are preferably used as the starting material in the present invention.

An amorphous calcination product formed by calcining a zeolite as mentioned above is often preferably used as the starting material in the present invention, because at the sintering step, the contraction of the volume is smaller than in case of the zeolite. When a sintered body is prepared according to the cofiring technique, it is especially preferred that the zeolite be once converted to an amorphous calcination product and the amorphous calcination product be used as the starting material.

The above-mentioned zeolite is advantageous in that if the zeolite is calcined at a low temperature, phase conversion to an amorphous calcination product is caused, and if the calcination product is fired at a higher temperature, phase conversion to a crystalline product is caused. If the crystalline product is once formed, 1200° C. or a higher temperature is necessary for obtaining a sintered body from this crystalline product.

Accordingly, the starting material used in the present invention should be the above-mentioned specific zeolite or an amorphous calcination product thereof.

Conditions for the phase conversion of the zeolite to the amorphous calcination product depend on the kind of the zeolite, but an amorphous calcination product is advantageously obtained by carrying out the calcination at a temperature of 750° to 900° C. for 1 to 5 hours.

In the case where the starting material fixture is formed by mixing the zeolite with a boron compound, as described hereinafter, and then calcining the mixture, the boron compound functions to lower the temperature at which an amorphous calcination product is obtained as compared to the temperature required without the added boron compound. This temperature reduction depends on the kind and amount added of the boron compound and cannot be simply defined. In general, however, the phase conversion to the amorphous calcination product is advanced at a temperature of at least 700° C.

As is apparent from the foregoing description, the conditions selected for obtaining the amorphous calcination product should not cause crystallization. Since the amorphous calcination product is present in the stable state, it is necessary that the conditions for obtaining the amorphous calcination product should be set in advance and the zeolite should be calcined under the set conditions. Furthermore, if desired, a powder of alumina, silica or calcia can be mixed and calcined with the zeolite, so far as the composition does not greatly deviate from the above-mentioned composition.

The zeolite or the amorphous calcination product obtained by calcining the zeolite is used in the form of a powder having a required particle size. In general, a commercially available powdery product can be used, but it is preferred that the zeolite or the calcination product thereof be used in the form of a powder having an average particle size smaller than 5 μm, especially smaller than 2 μm.

The other starting material used in the present invention is boron oxide or a boron compound capable of being converted to boron oxide by firing. If the boron compound is incorporated into the zeolite or the amorphous calcination product thereof, the boron compound exerts not only the function of lowering the sintering temperature but also the function of broadening the sintering temperature range. The reason why such effects can be attained by incorporation of the boron compound has not been elucidated. Although the allowable firing temperature range for the above-mentioned specific zeolite alone covers only about 10° C., if the above-mentioned starting mixture is used, the allowable firing temperature range can cover 50° to 150° C. or more. This effect is very industrially advantageous in that when a sintered body is obtained according to the cofiring technique, the firing temperature can be freely changed according to the composition of the electrically conductive substance.

Boron oxide or any of compounds capable of being converted to boron oxide can be used in the present invention. For example, boric acids such as orthoboric acid, metaboric acid and tetraboric acid, boron oxides such as boron trioxide and boron dioxide, and boron nitride and boron carbide are preferably used because they are easily available.

The mixing ratio of the boron compound depends on the desired expansion degree of the allowable firing temperature range, but it is generally preferred that the mixing ratio of the boron compound as $B_2O_3$ be 0.1 to 20% by weight, especiallY 0.5 to 10% by weight.

The zeolite or the amorphous calcination product formed by calcination of the zeolite and the above-mentioned boron compound can be mixed in the powdery state, but it is preferred that the mixing be carried out in the state where one or both of the starting materials are dissolved or dispersed in a solvent. For example, there is preferably adopted a method in which the zeolite or the amorphous calcination product obtained by calcining the zeolite is dispersed in an alkaline solution containing ammonia or the like dissolved therein, the dispersion is mixed with a solution containing the boron compound dissolved therein and the mixture is dried, because homogeneous mixing is possible according to this method. The kind of the solvent is not particularly critical, but in general, water or a solution formed by adding an acid or alkali to water is preferably used.

In the present invention, the above-mentioned starting material mixture should be molded before the firing. The shape of the molded body is determined according to the shape of the intended product, and any of rod-like, columnar and sheet-like shapes and the like can be selected without any limitation. Contraction of the volume of the molded body resulting from the firing should be taken into consideration. Known molding methods and machines can be used. In general, however, there may be adopted either a method in which the starting material powder is filled in a specific mold frame and molding is carried out under a pressure or pressure-lessly, or a green sheet molding method using a doctor blade. The starting material powder can be directly used, or a binder can be used according to need. Any of binders customarily used for molding and firing ceramics can be used without any limitation. Organic polymeric compounds such as polyvinyl butyral, polyvinyl alcohol and polymethyl methacrylate are generally preferably used as the binder.

The alkaline earth metal aluminosilicate sintered body, that is, the intended product of the present invention, can be obtained by firing the abovementioned molded body. The firing temperature depends on the kind and incorporated amount of the boron compound and the contents of impurities and cannot be simply defined. However, it is generally preferred that the firing temperature be selected from the range of from 800° to 1000° C., especially from 850° to 950° C. In the present invention, since the allowable temperature range for firing the zeolite or the amorphous calcination product thereof is greatly broadened by incorporation of the boron compound, it is preferred that the temperature for imparting a sufficiently high density to the obtained sintered body be determined in advance and the firing be conducted at this preliminarily determined temperature. The firing time is changed according to the firing temperature, but the firing time is 30 minutes to 20 hours, preferably 1 to 10 hours.

In the case where the firing temperature is relatively low, the denseness is sufficiently increased but it often happens that the crystallization is insufficient. In order to increase the mechanical strength of the obtained alkaline earth metal aluminosilicate sintered body, it is preferred that the crystallinity be as high as possible.

Accordingly, if the crystallization of the obtained sintered body is insufficient, it is preferred that after the densification is effected by sintering, the temperature be elevated above a level high enough to advance the crystallization sufficiently. The temperature sufficient for the crystallization depends on the ratio of the boron compound and the quantities of impurities. Accordingly, it is preferred that this temperature be confirmed in advance. The firing is sufficiently advanced in an oxygen atmosphere, for example, in air. However, in the case where a material to be printed dislikes an oxygen atmosphere in the cofiring method, an inactive or reducing atmosphere of nitrogen, carbon dioxide, hydrogen or the like can be adopted according to need.

The kind of the sintered body obtained according to the present invention differs according to the kind of the zeolite used as the starting material. For example, if a zeolite of the Ca form is used as the starting material, an anorthite sintered body is obtained, and if a zeolite of the Mg form is used, a cordierite sintered body is obtained. If a zeolite of the (Ca,Mg) form is used, an anorthite-cordierite sintered body is obtained. The crystal forms of these sintered bodies are known according to the kinds of alkaline earth metal aluminosilicates, and these sintered bodies can be confirmed by the X-ray diffractometry. For example, anorthite has characteristic peaks at $2\theta = 28.1° - 27.6°$, $24.1° - 23.8°$ and $22.2° - 21.6°$ in the X-ray diffraction chart, and cordierite has characteristic peaks at $2\theta = 10.3°, 21.6°, 28.3°$ and $29.4°$.

In preparing the alkaline earth metal aluminosilicate sintered body of the present invention, an inorganic filler customarily used for known low-temperature fired ceramics can be added so as to increase the mechanical strength of the obtained sintered body. However, in order to maintain good properties in the obtained sintered body, it is preferred that the amount incorporated of the inorganic filler be limited to up to 30% by weight. Known inorganic fillers for attaining the above effect can be used without any limitation. For example, alumina, cordierite, forsterite, mullite and quartz are preferably used as the inorganic filler.

According to the process of the present invention, the allowable range of firing temperatures for obtaining an alkaline earth metal aluminosilicate sintered body having a high density can be greatly expanded, and the control of the firing temperature can be facilitated. Furthermore, uneven sintering can be prevented even in carrying out the process on an industrial scale, and the yield can be drastically increased. In addition to the above-mentioned effect of expanding the allowable range of sintering-densifying temperatures, there can be attained an effect of lowering the densification-initiating temperature according to the present invention. Moreover, according to the present invention, the crystallization temperature for formation of crystals can be lowered, and hence, firing can be carried out at a much lower temperature. The sintered body obtained according to the process of the present invention are excellent in the electric characteristics and mechanical strength. Therefore, the present invention can be applied to the technique of firing a circuit-printed, electrically insulating material at a relatively low temperature with a good dimensional stability.

The present invention will now be described in detail with reference to the following examples and comparative examples that by no means limit the scope of the invention. The data shown in the examples and comparative examples are those determined according to the following methods.

(1) Density (g/cc) of Sintered Body
The density of the sintered body was determined according to the Archimedes method.

(2) Confirmation of Crystal of Sintered Body
The crystal of the sintered body was confirmed by comparing the X-ray diffraction chart with a known chart of the alkaline earth metal aluminosilicate.

(3) Linear Shrinkage (%)
The length ($L_1$) of the molded body before the firing and the length ($L_2$) of the molded body after the firing were measured, and the linear shrinkage was calculated according to the following formula:

$$\text{Linear shrinkage} = \frac{L_1 - L_2}{L_1} \times 100$$

(4) Crystallinity (%) of Sintered Body
The crystallinity of the sintered body was calculated from the height of the main peak ($2\theta = 28.1°$ to $27.6°$ in case of anorthite and $2\theta = 29.1°$ to $29.7°$ in case of cordierite).

(5) Flexural Strength (kgf/mm$^2$)
The three-point bending strength was measured according to the bending test method for fine ceramics, specified in JIS R-1601.

EXAMPLE 1

Zeolite 4A (Toyo Builder supplied by Toyo Soda), which is a zeolite of the sodium form, was ionexchange with a 10% aqueous solution of calcium chloride, washed with water and dried to obtain a zeolite of the calcium form (zeolite 5A) having a composition of ($0.03Na_2O.0.97CaO$) $0.96Al_2O_3.1.85SiO_2$. The average grain size of this zeolite was 1.5 μm.

In water was suspended 36 g of the obtained zeolite of the calcium form, and aqueous ammonia was added to the suspension to adjust the pH value to 10.5. Then, a 1% by weight aqueous solution of orthoboric acid was added dropwise to the suspension with stirring. Then, the solid was washed with water and dried, and the obtained powder was analyzed. It was found that the powder contained the boric acid in an amount of 4% by weight as $B_2O_3$.

The obtained powdery mixture was calcined at 750° C. for 3 hours to render it amorphous. The calcination product was pulverized to obtain an amorphous powder. A binder was added to the amorphous powder, and the mixture was molded into a sheet. The molded sheet was fired at a temperature shown in Table 1 for 3 hours. The density and flexural strength of the obtained anorthite sintered body are shown in Table 1. The shrinkage of the sintered body was in the range of from 16.0 to 18.0%. Incidentally, the theoretical density of the sintered body is 2.68.

TABLE 1

| Run | Firing Temperature (°C.) | Density of Sintered Body (g/cm$^3$) | Crystallinity (%) | Flexural Strength (kgf/mm$^2$) |
|---|---|---|---|---|
| 1 | 840 | 266 | 70 | 12 |
| 2 | 860 | 267 | 90 | 13 |
| 3 | 880 | 266 | 100 | 18 |
| 4 | 900 | 266 | 100 | 18 |
| 5 | 940 | 266 | 100 | 16 |

EXAMPLE 2

An anorthite sintered body was prepared in the same manner as described in Example 1 except that the kind of the boron compound and the amount added (as $B_2O_3$) were changed as shown in Table 2. The range of firing temperatures giving an anorthite sintered body having a density higher than 98% of the theoretical density and the lowest firing temperature giving the crystallinity of 100% are shown in Table 2. The linear shrinkage of the sintered body was in the range of from 16.0 to 18.0%.

TABLE 2

| Run | Boron Compound kind | amount added (% by weight) | Allowable Firing Temperature Range (°C.) | Lowest Firing Temperature (°C.) Giving Crystallinity of 100% |
|---|---|---|---|---|
| 1 | H$_3$BO$_3$ | 1.0 | 860~930 | 900 |
| 2 | H$_3$BO$_3$ | 2.0 | 840~940 | 880 |
| 3 | H$_3$BO$_3$ | 6.0 | 820~940 | 850 |
| 4 | H$_3$BO$_3$ | 15.0 | 820~880 | 830 |
| 5 | B$_2$O$_3$ | 4.0 | 840~940 | 880 |

EXAMPLE 3

Zeolite X (calcium form)(Zeostar CX-100P supplied by Nippon Kagaku Kogyo) was ion exchanged in a 10% aqueous solution of calcium chloride, washed with water and dried to obtain a zeolite of the calcium form [($0.05Na_2O.0.95CaO$).$Al_2O_3.2.4SiO_2$, average grain size = 4 μm]. The powder was pulverized and calcined at 850° C. for 2 hours in a calcination furnace. By the X-ray diffractometry, the powder was identified as being amorphous. The powder was mixed with H$_3$BO$_3$ so that the amount of H$_3$BO$_3$ was 4% by weight as B$_2$O$_3$, and the mixture was pulverized and filled in a mold and rubber press molding was carried out under 500 kg/cm$^2$ to obtain a molded body having a diameter of 30 mm and a height of 5 mm. An anorthite sintered body was obtained by firing the molded body in the same manner as described in Example 1. It was found that firing temperatures giving a sintered body having a density higher than 98% of the theoretical density were in the range of from 860° to 940° C. and the lowest temperature giving the crystallinity of 100% was 900° C. The linear shrinkage was 17.9%.

EXAMPLE 4

An anorthite sintered body was prepared in the same manner as described in Example 3 except that the amount added of H$_3$BO$_3$ was changed to 6% by weight as B$_2$O$_3$ and the calcination was not carried out. The firing temperatures giving a sintered body having a density higher than 98% of the theoretical density were in the range of from 840° to 940° C. and the lowest firing temperature giving the crystallinity of 100% was 860° C. The linear shrinkage was 30.2%.

COMPARATIVE EXAMPLE 1

An anorthite sintered body was prepared in the same manner as described in Example 1 except that the boric acid was not added. The firing temperatures giving a sintered body having a density higher than 98% of the theoretical density were in the range of from 880° to 900° C., and the lowest firing temperature giving the crystallinity of 100% was 920° C.

EXAMPLE 5

The same zeolite 4A of the sodium form as used in Example 1 was ion-exchanged with a 10% aqueous solution of potassium chloride and washed with water to obtain a zeolite of the potassium form having a composition of $(0.2Na_2O.0.8K_2O).0.96Al_2O_3.1.85SiO_2$. This zeolite of the potassium form was ion-exchanged with a 10% aqueous solution of calcium chloride, washed with water and dried to obtain a potassium-containing zeolite of the calcium form having a composition of $(0.04K_2O.0.01Na_2O.0.95CaO).0.96Al_2O_3.1.85SiO_2$. An anorthite sintered body was prepared in the same manner as described in Example 3 except that the obtained potassium-containing zeolite of the calcium form was used. The allowable firing temperature range was from 840° to 940° C., and the lowest firing temperature giving the crystallinity of 100% was 880° C.

EXAMPLE 6

The procedures of Example 3 were repeated in the same manner except that a zeolite having a composition shown in Table 3 was prepared and $H_3BO_3$ was added to the zeolite in an amount of 3% by weight as $B_2O_3$. The obtained results are shown in Table 3. The flexural strength shown in Table 3 is the flexural strength of a substrate board obtained by conducting the firing at 900° C. for 1 hour.

TABLE 3

| Run No. | $(aNa_2O.bK_2O.cCaO.dMgO.eBaO).0.96AlO_3.1.85SiO_2$ | | | | | Allowable Firing Temperature Range (°C.) | Lowest Temperature (°C.) Giving Crystallinity of 100% | Flexural Strength (kgf/mm²) |
|---|---|---|---|---|---|---|---|---|
| | a | b | c | d | e | | | |
| 1 | 0.08 | 0 | 0.87 | 0.05 | 0 | 840~940 | 880 | 18 |
| 2 | 0.08 | 0 | 0.82 | 0.10 | 0 | 800~930 | 880 | 20 |
| 3 | 0.08 | 0 | 0.77 | 0.15 | 0 | 790~930 | 880 | 19 |
| 4 | 0.08 | 0 | 0.72 | 0.20 | 0 | 780~930 | 880 | 21 |
| 5 | 0.08 | 0 | 0.62 | 0.30 | 0 | 780~910 | 880 | 20 |
| 6 | 0.01 | 0.07 | 0.77 | 0.15 | 0 | 800~930 | 880 | 20 |
| 7 | 0.08 | 0 | 0.77 | 0 | 0.15 | 840~940 | 880 | 16 |

EXAMPLE 7

A zeolite having the composition Run No. 2 in Table 3 was prepared and calcined at 770° C. A sheet was prepared in the same manner as described in Example 1, and an Ag-Pd type electroconductive paste was coated on one surface of the sheet by the screen printing method and the coated sheet was dried. Sheets prepared in the foregoing manner were laminated, and the laminate was fired at 900° C. for 1 hour to obtain a multilayer printed board.

The adhesion strength between this board (5 mm×5 mm) and the electroconductive pad having a thickness of 10 μm was 2 kgf/mm² and it was confirmed that the adhesion strength was good. The resistance of the conductor was 17 mΩ per unit square area, which was within the set value resin of the paste, that is, within the range of 15 to 20 mΩ per unit square area. When the solder wettability of the conductor was evaluated by the visual observation after dipping in a solder containing 2% of Ag at 220° C. for 5 seconds, it was found that the solder wettability was very good.

We claim:

1. A process for the preparation of an alkaline earth metal aluminosilicate sintered body, which comprises molding a starting mixture comprising (i) a zeolite of an alkaline earth metal form having an $SiO_2/Al_2O_3$ molar ratio not higher than 3.0 or an amorphous calcination product formed by calcining said zeolite and (ii) a boron compound selected from the group consisting of boron oxide and boron compounds capable of being converted to boron oxide by firing, and firing the molded body at a temperature lower than 1000° C.

2. A process for the preparation of an alkaline earth metal aluminosilicate sintered body according to claim 1, wherein the zeolite of an alkaline earth metal form is a zeolite represented by the following general formula [I]:

$$(iM^1O.jM_2{}^2O).lAl_2O_3.mSiO_2.nH_2O \qquad [I]$$

wherein $M^1$ represents an alkaline earth metal ion, $M^2$ represents an alkali metal ion or an ammonium ion, i, j, l and m are numbers satisfying the requirements of $i+j=1$, $j=0$ to 0.15, $l=0.9$ to 1.1, $m=1.5$ to 3.0 and $m/l=1.5$ to 3, and n is 0 or a positive number.

3. A process for the preparation of an alkaline earth metal aluminosilicate according to claim 1, wherein the zeolite of an alkaline earth metal form is a zeolite represented by the following general formula [II]:

$$(kCaO.pMgO.qM_2{}^2O).lAl_2O_3.mSiO_2.nH_2O \qquad [II]$$

wherein $M^2$ represents an alkali metal ion or an ammonium ion, k, p, q, l and m are numbers satisfying the requirements of $k+p+q=1$, $p/k=0.05$ to 1, $q=0$ to 0.15, $l=0.9$ to 1.1, $m=1.5$ to 3.0 and $m/l=1.5$ to 3.0, and n is 0 or a positive number.

4. A process for the preparation of an alkaline earth metal aluminosilicate sintered body according to claim 1, wherein the starting mixture is an amorphous calcination product having an $SiO_2/Al_2O_3$ molar ratio not higher than 3, which is obtained by mixing the boron compound to the zeolite of an alkaline earth metal form and calcining the mixture.

5. A process for the preparation of an alkaline earth metal aluminosilicate sintered body according to claim 1, wherein the boron compound is mixed in an amount of 0.1 to 20% by weight as $B_2O_3$.

6. A process for the preparation of an alkaline earth metal aluminosilicate sintered body according to claim 1, wherein the boron compound is boron oxide, boric acid, boron nitride or boron carbide.

7. A process for the preparation of an alkaline earth metal aluminosilicate sintered body according to claim 1, wherein the boron compound is dissolved in a solvent and is mixed in the liquid state with the zeolite of an alkaline earth metal form or the amorphous calcination product obtained by calcining said zeolite.

8. A process for the preparation of an alkaline earth metal aluminosilicate sintered body according to claim 7, wherein the solvent is water.

9. A process for the preparation of an alkaline earth metal aluminosilicate sintered body according to claim 1 wherein the firing is carried out at a temperature of from about 850° to about 950° C.

10. The process according to claim 9 wherein the firing is conducted for from about 1 to about 10 hours.

11. A process for the preparation of an alkaline earth metal aluminosilicate sintered body according to claim 1 wherein the starting mixture comprises the boron compound and a zeolite of calcium form or an amorphous calcination product thereof and the resulting sintered body is an anorthite.

12. A process for the preparation of an alkaline earth metal aluminosilicate sintered body according to claim 1 wherein the starting mixture comprises the boron compound and a zeolite of magnesium form or an amorphous calcination product thereof, and wherein the resulting sintered body is a cordierite.

* * * * *